United States Patent
Ren et al.

(10) Patent No.: US 11,190,979 B2
(45) Date of Patent: Nov. 30, 2021

(54) METHODS AND APPARATUS FOR FORWARDING PACKETS BETWEEN CHILD NODES AND PARENT NODES

(71) Applicant: Huawei Technologies Co., Ltd., Shenzhen (CN)

(72) Inventors: Shoushou Ren, Beijing (CN); Bing Liu, Beijing (CN); Chuang Wang, Beijing (CN); Delei Yu, Beijing (CN); Sheng Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/855,342

(22) Filed: Apr. 22, 2020

(65) Prior Publication Data

US 2020/0252832 A1     Aug. 6, 2020

Related U.S. Application Data

(63) Continuation of application No. PCT/CN2019/080038, filed on Mar. 28, 2019.

(30) Foreign Application Priority Data

Apr. 23, 2018  (CN) .......................... 201810367727.1

(51) Int. Cl.
| | | |
|---|---|---|
| *H04W 28/06* | (2009.01) | |
| *H04W 28/02* | (2009.01) | |
| *H04W 40/10* | (2009.01) | |
| *H04W 56/00* | (2009.01) | |

(52) U.S. Cl.
CPC ..... *H04W 28/065* (2013.01); *H04W 28/0278* (2013.01); *H04W 40/10* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 8,027,366 | B1 | 9/2011 | Tang et al. |
| 8,156,209 | B1 | 4/2012 | Phadnis et al. |
| 8,559,306 | B2 | 10/2013 | Gong et al. |
| 2006/0215583 | A1* | 9/2006 | Castagnoli .............. H04L 45/60 370/254 |
| 2008/0225804 | A1 | 9/2008 | Thubert et al. |

(Continued)

FOREIGN PATENT DOCUMENTS

| | | |
|---|---|---|
| CN | 101471766 A | 7/2009 |
| CN | 101800692 A | 8/2010 |

(Continued)

*Primary Examiner* — Anh Ngoc M Nguyen
(74) *Attorney, Agent, or Firm* — Slater Matsil, LLP

(57) ABSTRACT

This application provides a packet sending method, applied to a communications system including at least two nodes, the at least two nodes include at least one parent node having a child node, a packet sent by the child node is forwarded by the parent node, and the method includes: receiving, by a first node, first instruction information, where the first instruction information is used to instruct the first node to send a packet after a first moment, and the first node is a parent node; and sending, by the first node, a first packet according to the first instruction information.

19 Claims, 5 Drawing Sheets

(56) References Cited

U.S. PATENT DOCUMENTS

| | | | |
|---|---|---|---|
| 2010/0226342 A1* | 9/2010 | Colling | H04W 56/002 |
| | | | 370/336 |
| 2014/0119204 A1 | 5/2014 | Guo et al. | |
| 2016/0174192 A1* | 6/2016 | Raghu | H04W 72/1289 |
| | | | 370/329 |
| 2017/0353933 A1* | 12/2017 | Xhafa | H04W 56/001 |

FOREIGN PATENT DOCUMENTS

| | | |
|---|---|---|
| CN | 101990238 A | 3/2011 |
| CN | 102118819 A | 7/2011 |
| CN | 102271079 A | 12/2011 |
| CN | 104023039 A | 9/2014 |
| CN | 107580768 A | 1/2018 |
| EP | 1868325 B1 | 12/2009 |
| EP | 2434704 A1 | 3/2012 |
| EP | 2466986 A1 | 6/2012 |
| EP | 3076612 A1 | 10/2016 |
| KR | 20040062252 A | 7/2004 |
| WO | 2006102558 A2 | 9/2006 |

\* cited by examiner

METHODS AND APPARATUS FOR FORWARDING PACKETS BETWEEN CHILD NODES AND PARENT NODES

CROSS-REFERENCE TO RELATED APPLICATIONS

This application is a continuation of International Application No. PCT/CN2019/080038, filed on Mar. 28, 2019, which claims priority to Chinese Patent Application No. 201810367727.1, filed on Apr. 23, 2018. The disclosures of the aforementioned applications are hereby incorporated by reference in their entireties.

TECHNICAL FIELD

This application relates to the communications field, and more specifically, to a packet sending method and a packet sending apparatus.

BACKGROUND

With maturity of wireless personal area network communication technologies (WPAN), a wireless mesh network and a mobile ad hoc network in which multi-hop extension is performed based on the WPAN are widely applied. A tree topology network structure is more or less formed in each of topology network structures formed based on the two types of networks.

In the tree topology network structure, for a packet upward sent by each child node, each parent node on a link needs to forward the packet. In addition, an upper-layer node needs to forward more packets, and therefore the node needs to be frequently activated. Consequently, power of the node is greatly consumed. Therefore, how to improve packet sending performance becomes an urgent problem to be resolved.

SUMMARY

This application provides a packet sending method and a packet sending apparatus, to improve packet sending performance.

According to a first aspect, a packet sending method is provided and is applied to a communications system including at least two nodes, the at least two nodes include at least one parent node having a child node, a packet sent by the child node is forwarded by the parent node, and the method includes: receiving, by a first node, first instruction information, where the first instruction information is used to instruct the first node to send a packet after a first moment, and the first node is a parent node; and sending, by the first node, a first packet according to the first instruction information.

According to the packet sending method provided in this embodiment of this application, the first node in the network system receives the first instruction information, which instructs the first node not to send a packet within a period of time. The first node may wait within the period of time for a child node to upward send a packet, and when the first moment arrives, the first node may send a packet generated by the first node to a parent node together with the packet upward sent by the child node. In this way, packet sending performance can be improved.

With reference to the first aspect, in an implementation of the first aspect, the sending, by the first node, a first packet according to the first instruction information includes: sending, by the first node, the first packet after the first moment according to the first instruction information.

According to the packet sending method provided in this embodiment of this application, the first node in the network system sends a packet only after the first moment, so that a time required by the first node to wait for a child node to upward send a packet can be provided.

With reference to the first aspect and the foregoing implementation of the first aspect, in another implementation of the first aspect, the sending, by the first node, a first packet according to the first instruction information includes: sending, by the first node according to the first instruction information, the first packet before the first moment when a first parameter meets a preset condition, where the first parameter includes at least one of the following parameters: a child node of the first node from which the first packet comes and a size of current remaining buffer space of the first node.

According to the packet sending method provided in this embodiment of this application, the first node in the network system may alternatively send a packet to a parent node when the first parameter meets the preset condition. In this way, packet sending can be triggered more flexibly.

Optionally, in some embodiments, the first parameter may be the child node of the first node.

For example, when each child node of the first node has reported a packet, the first node sends the first packet to the parent node. How the first node determines a quantity of child nodes connected to the first node is not limited in this embodiment of this application. The first node may determine the quantity based on system indication information, experience, or child node activeness.

For another example, when the first node does not include a child node, the first node directly sends the first packet to the parent node.

Optionally, in some embodiments, the first parameter may be the size of the current remaining buffer space of the first node.

For example, buffer space of the first node is A. When the current remaining buffer space of the first node is 0.1A, the first node sends the first packet to the parent node.

It should be understood that, when the first parameter meets the preset condition, before the first node sends a packet to the parent node, the first node still needs to be indicated, based on the first instruction information, that the first node does not need to send the first packet after the first moment. In other words, the first node needs to determine the first moment.

With reference to the first aspect and the foregoing implementations of the first aspect, in another implementation of the first aspect, before the sending, by the first node, a first packet according to the first instruction information, the method further includes: receiving, by the first node before the first moment, a second packet sent by a second node, where the second node is a child node of the first node; and generating, by the first node, the first packet based on the second packet.

According to the packet sending method provided in this embodiment of this application, the first node receives the second packet upward sent by the child node of the first node and generates the first packet, so that the second packet generated by the child node of the first node can be forwarded to the parent node. In this way, packet sending performance is improved.

With reference to the first aspect and the foregoing implementations of the first aspect, in another implementation of the first aspect, before the sending, by the first node, a first packet according to the first instruction information, the method further includes: generating, by the first node, a third packet based on to-be-sent data; and the generating, by the first node, the first packet based on the second packet includes: aggregating, by the first node, the second packet and the third packet to generate the first packet.

According to the packet sending method provided in this embodiment of this application, the first node generates the third packet based on the data that the first node needs to send, receives the second packet upward sent by the child node, and aggregates the second packet and the third packet to generate the first packet. The first node can aggregate the packet of the child node of the first node and the packet of the first node based on the first instruction information, and send the aggregated packet to the parent node of the first node. In this way, packet aggregation performance can be improved.

With reference to the first aspect and the foregoing implementations of the first aspect, in another implementation of the first aspect, before the sending, by the first node, a first packet according to the first instruction information, the method further includes: generating, by the first node, the first packet based on to-be-sent data.

According to the packet sending method provided in this embodiment of this application, the first node generates the first packet based on the data that the first node needs to send. To be specific, when no child node upward sends a packet, the first packet may be a packet generated by the first node.

With reference to the first aspect and the foregoing implementations of the first aspect, in another implementation of the first aspect, the first instruction information is specifically used to instruct the first node to send a packet after the first moment in a first sending period.

According to the packet sending method provided in this embodiment of this application, the first node may periodically send the first packet. A time segment, in each period, in which the first node waits for a child node to upward send a packet can be determined based on the first instruction information.

With reference to the first aspect and the foregoing implementations of the first aspect, in another implementation of the first aspect, the first instruction information is carried in synchronization clock signaling, and the synchronization clock signaling further includes indication information of a start moment of the first period.

According to the packet sending method provided in this embodiment of this application, the first instruction information may be carried in the synchronization clock signaling, and the synchronization clock signaling further includes the indication information of the start moment of the first period.

With reference to the first aspect and the foregoing implementations of the first aspect, in another implementation of the first aspect, the method further includes: receiving, by the first node, second indication information, where the second indication information is used to indicate that the synchronization clock signaling carries the first instruction information.

According to the packet sending method provided in this embodiment of this application, the first node can further determine, based on the second indication information, that the synchronization clock signaling carries the first instruction information.

With reference to the first aspect and the foregoing implementations of the first aspect, in another implementation of the first aspect, the second indication information and the synchronization clock signaling are carried in a same message.

According to the packet sending method provided in this embodiment of this application, the first node may receive a first message, where the first message includes the second indication information and the synchronization clock signaling.

With reference to the first aspect and the foregoing implementations of the first aspect, in another implementation of the first aspect, the first instruction information includes information about the first moment; and the method further includes: determining, by the first node, the first moment based on the information about the first moment.

According to the packet sending method provided in this embodiment of this application, the first instruction information may directly indicate the first moment, that is, explicitly indicate the first moment.

With reference to the first aspect and the foregoing implementations of the first aspect, in another implementation of the first aspect, the first instruction information is further used to indicate a first quantity, the first quantity is a quantity of times that the first instruction information is forwarded before reaching the first node; and the method further includes: obtaining, by the first node, the first moment through calculation based on the first quantity and preset first duration.

According to the packet sending method provided in this embodiment of this application, the first instruction information may indirectly indicate the first moment, that is, implicitly indicate the first moment.

With reference to the first aspect and the foregoing implementations of the first aspect, in another implementation of the first aspect, the first duration is determined based on a transmission delay between a parent node and a child node.

According to the packet sending method provided in this embodiment of this application, the first duration may be determined based on a data transmission delay between the child node and the parent node connected to the child node.

With reference to the first aspect and the foregoing implementations of the first aspect, in another implementation of the first aspect, the second indication information and the synchronization clock signaling are carried in a same message, the message includes a broadcast message based on the generic autonomic signaling protocol (GRASP), the second indication information is carried in front of an Internet protocol header (IP header) of the application message, and the synchronization clock signaling is carried in an option of a generic autonomic signaling protocol header (GRASP header) of the application message.

The child node can forward the message as soon as parsing out an IP layer of the message, thereby improving message forwarding efficiency.

Alternatively, both the first instruction information and the synchronization clock signaling are carried in tan option of the GRASP header of the application message.

In this way, an existing message IP header format does not need to be modified.

With reference to the first aspect and the foregoing implementations of the first aspect, in another implementation of the first aspect, the first packet further includes a second identifier, and the second identifier is used to indicate that the second packet can be subject to aggregation.

According to a second aspect, a packet sending method is provided and is applied to a communications system including at least two nodes, the at least two nodes include at least one parent node having a child node, a packet sent by the child node is forwarded by the parent node, and the method includes: sending, by a root node, first instruction information, where the first instruction information is used to instruct a first node to send a packet after a first moment, and the first node is a child node of the root node; and receiving, by the root node, a first packet, where the first packet is a packet sent by the first node according to the first instruction information.

According to the packet sending method provided in this embodiment of this application, the root node delivers the first instruction information, to instruct the first node not to send a packet within a period of time. The first node may wait within the period of time for a child node to upward send a packet, and when the first moment arrives, the first node may send a packet generated by the first node to the parent node together with the packet upward sent by the child node. In this way, packet sending performance can be improved.

With reference to the second aspect, in an implementation of the second aspect, the first packet is a packet sent by the first node after the first moment according to the first instruction information.

According to the packet sending method provided in this embodiment of this application, the first packet received by the root node may be a packet sent by the first node only after the first moment, so that a time required by the first node to wait for a child node to upward send a packet can be provided.

With reference to the second aspect and the foregoing implementation of the second aspect, in another implementation of the second aspect, the first packet is a packet sent according to the first instruction information by the first node before the first moment when a first parameter meets a preset condition, and the first parameter includes at least one of the following parameters: a child node of the first node from which the first packet comes and a size of current remaining buffer space of the first node.

According to the packet sending method provided in this embodiment of this application, the first packet received by the root node may alternatively be a packet sent by the first node to the root node when the first parameter meets the preset condition. In this way, packet sending can be triggered more flexibly.

With reference to the second aspect and the foregoing implementations of the second aspect, in another implementation of the second aspect, the first packet is a packet generated by the first node based on a second packet, the second packet is a second packet that is sent by a second node and that is received by the first node before the first moment, and the second node is a child node of the first node.

According to the packet sending method provided in this embodiment of this application, the first node receives the second packet upward sent by the child node of the first node and generates the first packet, so that the second packet generated by the child node of the first node can be forwarded to the root node. In this way, packet sending performance is improved.

With reference to the second aspect and the foregoing implementations of the second aspect, in another implementation of the second aspect, the first packet is a packet generated by the first node by aggregating the second packet and a third packet, and the third packet is a packet generated by the first node based on to-be-sent data before the first node sends the first packet according to the first instruction information.

According to the packet sending method provided in this embodiment of this application, the first node generates the third packet based on the data that the first node needs to send, receives the second packet upward sent by the child node, and aggregates the second packet and the third packet to generate the first packet. The first node can aggregate the packet of the child node of the first node and the packet of the first node based on the first instruction information, and send the aggregated packet to the parent node of the first node. In this way, packet aggregation performance can be improved.

With reference to the second aspect and the foregoing implementations of the second aspect, in another implementation of the second aspect, the first packet is a packet generated by the first node based on to-be-sent data.

According to the packet sending method provided in this embodiment of this application, the first node generates the first packet based on the data that the first node needs to send. To be specific, when no child node upward sends a packet, the first packet may be a packet generated by the first node.

With reference to the second aspect and the foregoing implementations of the second aspect, in another implementation of the second aspect, the first instruction information is specifically used to instruct the first node to send a packet after the first moment in a first sending period.

According to the packet sending method provided in this embodiment of this application, the first node may periodically send the first packet. A time segment, in each period, in which the first node waits for a child node to upward send a packet can be determined based on the first instruction information.

With reference to the second aspect and the foregoing implementations of the second aspect, in another implementation of the second aspect, the first instruction information is carried in synchronization clock signaling, and the synchronization clock signaling further includes indication information of a start moment of the first period.

According to the packet sending method provided in this embodiment of this application, the first instruction information may be carried in the synchronization clock signaling, and the synchronization clock signaling further includes the indication information of the start moment of the first period.

With reference to the second aspect and the foregoing implementations of the second aspect, in another implementation of the second aspect, the method further includes: sending, by the root node, second indication information, where the second indication information is used to indicate that the synchronization clock signaling carries the first instruction information.

According to the packet sending method provided in this embodiment of this application, the first node can further determine, based on the second indication information, that the synchronization clock signaling carries the first instruction information.

With reference to the second aspect and the foregoing implementations of the second aspect, in another implementation of the second aspect, the second indication information and the synchronization clock signaling are carried in a same message.

According to the packet sending method provided in this embodiment of this application, the first node may receive a first message, where the first message includes the second indication information and the synchronization clock signaling.

With reference to the second aspect and the foregoing implementations of the second aspect, in another implementation of the second aspect, the first instruction information includes information about the first moment, and the information about the first moment is used to determine the first moment.

According to the packet sending method provided in this embodiment of this application, the first instruction information may directly indicate the first moment, that is, explicitly indicate the first moment.

With reference to the second aspect and the foregoing implementations of the second aspect, in another implementation of the second aspect, the first instruction information is further used to indicate a first quantity, the first quantity is a quantity of times that the first instruction information is forwarded before reaching the first node, and the first quantity and preset first duration are used to calculate the first moment.

According to the packet sending method provided in this embodiment of this application, the first instruction information may indirectly indicate the first moment, that is, implicitly indicate the first moment.

With reference to the second aspect and the foregoing implementations of the second aspect, in another implementation of the second aspect, the first duration is determined based on a transmission delay between a parent node and a child node.

According to the packet sending method provided in this embodiment of this application, the first duration may be determined based on a data transmission delay between the child node and the parent node connected to the child node.

According to a third aspect, a packet sending apparatus is provided. The apparatus can be configured to perform an operation of the first packet sending apparatus in any one of the first aspect or the possible implementations of the first aspect. Specifically, the packet sending apparatus includes a corresponding means configured to perform the steps or functions described in the first aspect, and may be the first packet sending apparatus in the first aspect. The steps or the functions may be implemented by using software, hardware, or a combination of hardware and software.

According to a fourth aspect, a packet sending apparatus is provided. The apparatus can be configured to perform an operation of the second packet sending apparatus in any one of the second aspect or the possible implementations of the second aspect. Specifically, the apparatus may include a corresponding means configured to perform the steps or functions described in the second aspect. The steps or the functions may be implemented by using software, hardware, or a combination of hardware and software.

According to a fifth aspect, a packet sending system is provided and includes a processor and a memory. The memory is configured to store a computer program, and the processor is configured to invoke the computer program from the memory and run the computer program, to enable the packet sending apparatus to perform the packet sending method in any one of the first aspect or the possible implementations of the first aspect or in any one of the second aspect or the possible implementations of the second aspect.

Optionally, there are one or more processors and one or more memories.

Optionally, the memory may be integrated into the processor, or the memory and the processor are separately disposed.

Optionally, the packet sending system further includes a transmitter and a receiver.

In a possible design, a packet sending system is provided and includes a transceiver, a processor, and a memory. The processor is configured to control the transceiver to send or receive a signal, the memory is configured to store a computer program, and the processor is configured to invoke the computer program from the memory and run the computer program, to enable the packet sending system to perform the method in any one of the first aspect or the possible implementations of the first aspect.

In another possible design, a packet sending system is provided and includes a transceiver, a processor, and a memory. The processor is configured to control the transceiver to send or receive a signal, the memory is configured to store a computer program, and the processor is configured to invoke the computer program from the memory and run the computer program, to enable the packet sending system to perform the method in any one of the second aspect or the possible implementations of the second aspect.

According to a sixth aspect, a system is provided, and the system includes the foregoing packet sending apparatuses.

According to a seventh aspect, a computer program product is provided, and the computer program product includes a computer program (which may also be referred to as code or an instruction). When the computer program is run, a computer is enabled to perform the method in any one of the first aspect or the possible implementations of the first aspect or in any one of the second aspect or the possible implementations of the second aspect.

According to an eighth aspect, a computer-readable medium is provided, and the computer-readable medium stores a computer program (which may also be referred to as code or an instruction). When the computer program is run on a computer, the computer is enabled to perform the method in any one of the first aspect or the possible implementations of the first aspect or in any one of the second aspect or the possible implementations of the second aspect.

According to a ninth aspect, a chip system is provided and includes a memory and a processor. The memory is configured to store a computer program, and the processor is configured to invoke the computer program from the memory and run the computer program, to enable a packet sending apparatus on which the chip system is installed, to perform the method in any one of the first aspect or the possible implementations of the first aspect or in any one of the second aspect or the possible implementations of the second aspect.

According to the packet sending method and the packet sending apparatus in the embodiments of this application, the first node determines, based on the received first instruction information, to send the first packet, so that packet sending performance can be improved.

DETAILED DESCRIPTION OF ILLUSTRATIVE EMBODIMENTS

The following describes technical solutions in this application with reference to accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or new radio (NR).

A node in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the node may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application. Alternatively, the node in the embodiments of this application may be a device configured to communicate with a terminal device. The node may be a base transceiver station (BTS) in a global system for mobile communications (GSM) or code division multiple access (CDMA), or may be a NodeB (NB) in a wideband code division multiple access (WCDMA) system, or may be an evolved NodeB (Evolutional NodeB, eNB or eNodeB) in an LTE system, or may be a radio controller in a cloud radio access network (CRAN) scenario. Alternatively, the node may be a relay station, an access point, a vehicle-mounted device, a wearable device, a network device in a future 5G network, a network device in a future evolved PLMN network, or the like.

Figure 1:
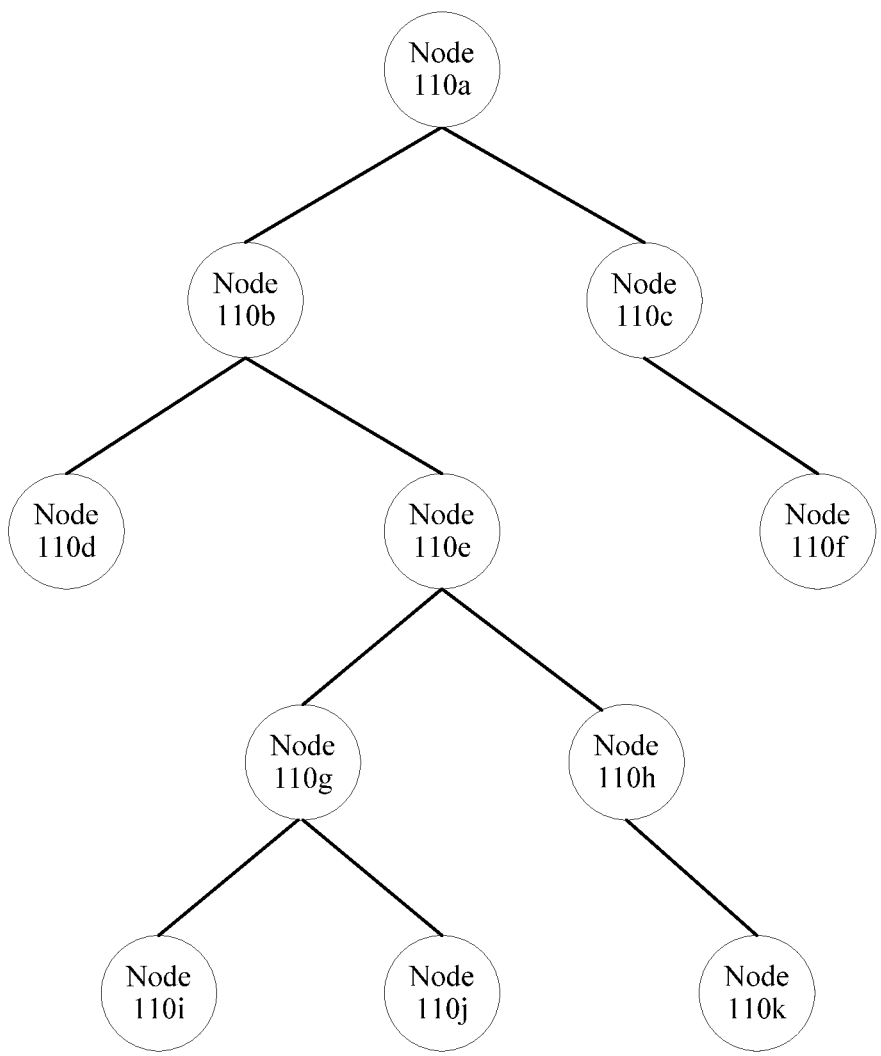
FIG. 1 is a schematic diagram of a tree topology network structure to which a packet sending method and apparatus in the embodiments of this application are applicable.

FIG. 1 is a schematic diagram of a tree topology network structure to which a packet sending method and apparatus in the embodiments of this application are applicable. The schematic diagram includes nodes 110. The tree topology network structure is described below in detail.

The nodes 110 (include a node 110*a* to a node 110*k* shown in FIG. 1). Each node in the embodiments of this application may be a sensor used by a terminal device in the Internet of things (IoT) to transmit information, for example, a sensor used for humidity monitoring, temperature monitoring, or traffic monitoring, or may be a terminal device or a network device.

The tree topology network includes a root node (the node 110*a* shown in FIG. 1) that receives a plurality of packets. The node 110*a* can process the packets.

For example, the node 110*a* classifies the packets, and assigns priorities to the packets. A specific function of the root node in the tree topology network is not limited in the embodiments of this application. The root node may be any gateway device or terminal device, and can complete a function of the gateway device or the terminal device.

The tree topology network structure further includes child nodes (the node 110*b* to the node 110*h* shown in FIG. 1) of the root node. Child nodes (the node 110*b* and the node 110*c* shown in FIG. 1) connected to the root node may receive a packet sent by the root node 110*a*, may send packets to the root node 110*a*, and may further receive packets sent by other child nodes (the node 110*d*, the node 110*e*, and the node 110*f* shown in FIG. 1) connected to the child nodes.

Optionally, in some embodiments, the child node may send a packet to an uplink node connected to the child node.

Optionally, in some other embodiments, the child node may receive a packet from the uplink node connected to the child node.

Optionally, in some other embodiments, the child node may send a packet to a downlink node connected to the child node.

Optionally, in some other embodiments, the child node may receive a packet from the downlink node connected to the child node.

The tree topology network further includes child nodes (the node 110*i* to the node 110*k* shown in FIG. 1). The child nodes may send packets to respective parent nodes connected to the child nodes, and may receive packets from the respective parent nodes connected to the child nodes.

Basic application of the tree topology is briefly described below.

With maturity of wireless personal area network communication technologies (WPAN), a wireless mesh network and a mobile ad hoc network in which multi-hop extension is performed based on the WPAN are widely applied.

The WPAN is a personal area network in which a wireless connection is used. In addition to 802.15 based on a Bluetooth technology, the Institute of Electrical and Electronics Engineers (IEEE) further recommends two other types: low frequency 802.15.4 ($TG_4$), also referred to as a ZigBee protocol; and high frequency 802.15.3 ($TG_3$), also referred to as an ultra wideband (UWB) or carrierless communication technology.

The WPAN is an emerging wireless communications network technology proposed to achieve a wireless seamless connection, with a small activity radius and rich service types, originated to a specific group.

The Ad Hoc is a network combining mobile communications and a computer network, and is a type of mobile computer network. A user terminal can move freely within the network while maintaining communication. As a multi-hop temporary autonomous system, the Ad Hoc has unique advantages in many important fields such as military, civilian, and commercial fields. With continuous development of mobile technologies and people's increasing demand for free communication, the ad hoc network may attract more concern, and get faster development and popularization. The Ad Hoc is a self-organizing network and supports node mobility, and nodes in the network establish a multi-hop network through automatic route discovery.

The wireless mesh network includes mesh routers and mesh clients. The mesh routers constitute a backbone network, are connected to the wired Internet, and are responsible for providing a multi-hop wireless Internet connection for the mesh clients.

The wireless mesh network is also referred to as a "multi-hop" network. The wireless mesh network is a new wireless network technology totally different from a conventional wireless network, and may be implemented through automatic discovery or static route configuration. The tree topology network structure shown in FIG. 1 is more or less formed in each of topologies formed based on the ad hoc network and wireless mesh network technologies. To be specific, a root node is connected to a plurality of intermediate nodes, some of the intermediate nodes are further connected to a plurality of intermediate nodes, and some of the intermediate nodes are further connected to a plurality of leaf nodes.

The "multi-hop network" is constructed by using nodes, including devices such as a computer and a mobile phone. These devices are all wirelessly connected to each other, and then can forward data to each other over the network. Data hops from a node to another node until the data reaches a destination. Data is always available unless all the nodes fail. This makes such a network topology reliable and scalable.

Therefore, to ensure connection validity, effectively detect an abnormal disconnection from a party in time, and ensure that connected resources are effectively utilized, a keepalive mechanism is needed. Usually, the keepalive mechanism includes two processing manners:
1. A node implements keepalive by using a transmission control protocol (TCP) layer.
2. A node implements a heartbeat data packet at an application layer.

In the tree topology network structure, there are clear uplink and downlink communication directions between nodes. In uplink communication, leaf nodes and/or intermediate nodes send packets to a same root node, and an uplink is formed based on a connection relationship between nodes in the uplink communication. In downlink communication, a root node sends a packet (a data packet/an application message) to one or more intermediate nodes, and a downlink is formed based on a connection relationship between nodes in the downlink communication.

In the tree topology network structure, an online state of a node needs to be maintained as in another network structure.

A network system usually maintains an online state of each device in the network system by using a periodic heartbeat keepalive mechanism. To be specific, a leaf node and/or an intermediate node need/needs to periodically send heartbeat messages/a heartbeat message to a root node. The heartbeat messages/heartbeat message are/is used to indicate that the leaf node and/or the intermediate node that send/sends the heartbeat messages/heartbeat message are/is still online.

It should be understood that, the tree topology network structure form based on the ad hoc network or wireless mesh network technology is merely an example.

In many IoT network scenarios, each device in a network also often needs to periodically report a data message collected by the device. For example, each device that implements humidity monitoring, temperature and humidity monitoring, or traffic monitoring in a network system needs to periodically report a humidity, temperature, or traffic message obtained through measurement.

The message includes the following characteristics.
1. A point-to-point communication manner is used. The message is usually transmitted between a child node and a root node on a downlink through point-to-point communication.
2. There are a large total quantity of messages. There are usually a relatively large quantity of nodes in the tree topology network structure. Especially, in an IoT network scenario, there are thousands or even tens of thousands nodes.

In some embodiments, each node needs to periodically and continuously report a message, resulting in a large total quantity of messages.
3. There are a relatively large quantity of branch layers. There are usually a relatively large quantity of branch layers in the tree topology network. In other words, nodes (the node 110a, the node 110b, the node 110e, the node 110g, and the node 110i shown in FIG. 1) are connected stage by stage.
4. The message generally has a heavy header and a light payload: Each packet reported by a node usually has a relatively small amount of data, which is of about a dozen bytes.

A size of a header of the packet is usually greater than the amount of data in the packet.

A header of an Internet protocol (IP) layer packet is used as an example. A header of an Internet protocol version 4 (IPv4) packet is of 20 bytes. In all IoT network scenarios, the Internet protocol version 6 (IPv6) is used, and a header of an IPv6 packet is of 40 bytes, which, together with headers of packets such as a media access control (MAC) layer packet and a transmission layer packet, causes a header of an overall packet to be great compared with an effective amount of data of the packet.

Due to the characteristics included in the message, for example, because an uplink message is periodically sent, the following problems are caused:

As shown in FIG. 1, because a point-to-point message sending mechanism is used in the tree topology network, a node closer to the node 110a needs to send more messages. The node 110a has a most prominent bandwidth bottleneck. When a message is periodically sent, if a node has relatively low physical layer bandwidth, only the message occupies a large proportion of the bandwidth, and little bandwidth is left for a service. This may affect a normal service.

In addition, when each child node sends a packet to a root node, each uplink child node of the child node needs to forward the packet. For example, as shown in FIG. 1, when the node 110k needs to send a packet to the node 110a, the packet needs to be forwarded by the node 110h, the node 110e, and the node 110b.

It can be learned from above that an upper-layer node needs to forward more packets, and therefore an air interface of the upper-layer node needs to be frequently activated. Consequently, power of the upper-layer node is greatly consumed.

It should be understood that, FIG. 1 shows only one network scenario to which the embodiments of this application are applicable, and cannot limit the protection scope of this application.

The packet sending method provided in the embodiments of this application is also applicable to another scenario in which a message needs to be periodically sent or a network system in which a message is aperiodically sent but requires a plurality of times of forwarding and aggregation. The embodiments of this application are mainly about how to perform packet aggregation for a message.

In the prior art, to avoid the foregoing problems that point-to-point communication causes power consumption and a header of a message occupies a large proportion of bandwidth, a packet aggregation manner based on a hop count is proposed.

Packet aggregation based on a hop count is described below in detail with reference to FIG. 2. The hop count is a quantity of packet aggregation times.

Figure 2:
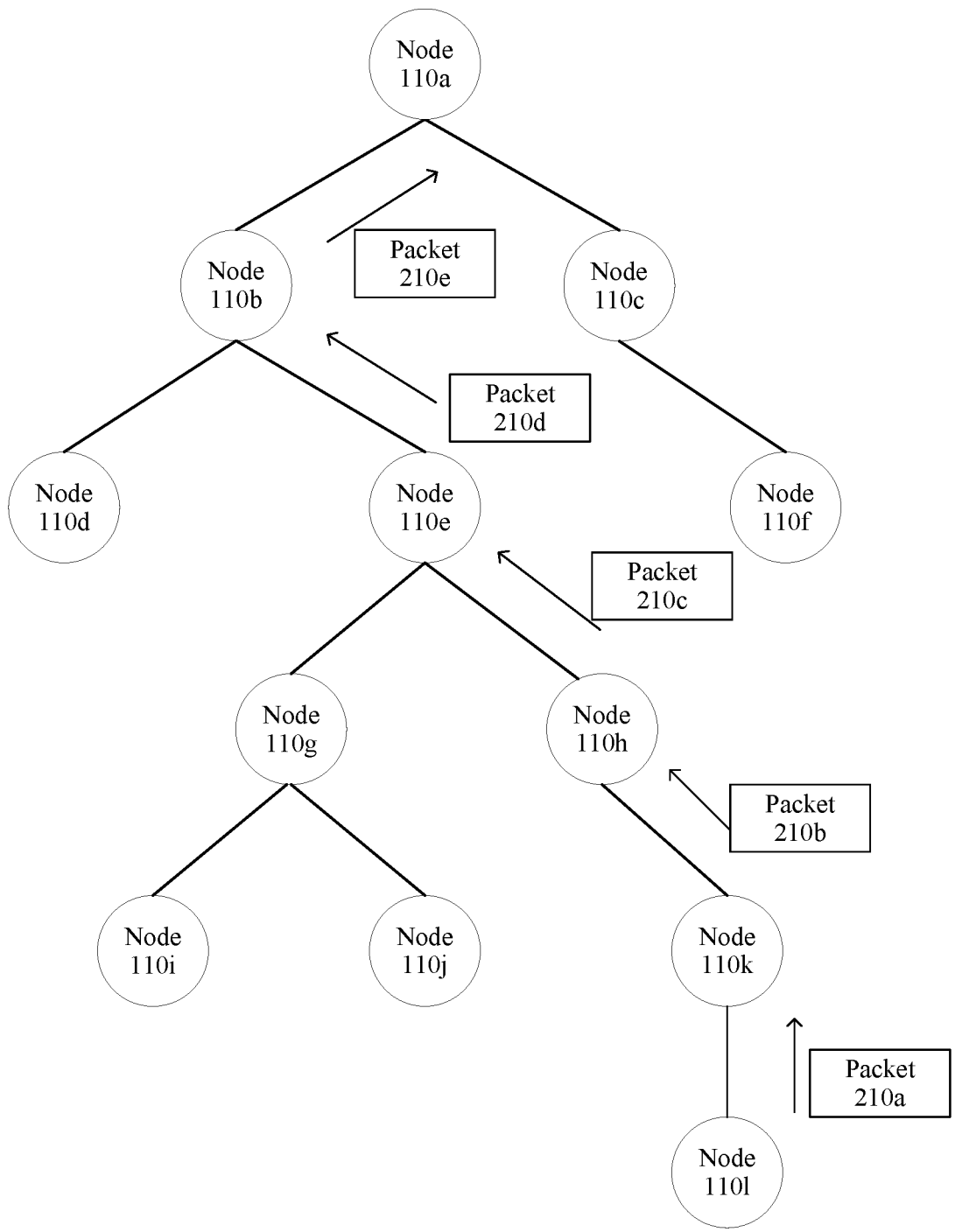
FIG. 2 is a schematic diagram of a packet sending method.

FIG. 2 is a schematic diagram of a packet sending method. The schematic diagram includes nodes 110 and packets 210. The packet aggregation based on a hop count is described below in detail with reference to FIG. 2.

Similar to the nodes 110 shown in FIG. 1, the nodes 110 (including a node 110a to a node 110l shown in FIG. 2) may be sensors, terminal devices, or gateway devices. Details are not described herein again.

The packets 210 (including a packet 210a to a packet 210e shown in FIG. 2) are packets sent by nodes to a root node. FIG. 2 describes how to implement the packet aggregation based on a hop count by using an uplink from the node 110l to the node 110k, the node 110h, the node 110e, the node 110b, and the node 110a as an example.

The packet 210a is a packet that the node 110l needs to send to the root node 110a. However, the packet 210a needs to be forwarded by intermediate nodes, and then can be received by the root node 110a. The packet 210a includes a header and a payload.

It should be understood that, specific payload content and a specific header form of the packet are not limited in this application, and the packet may be any packet.

Optionally, the packet 210a includes a flag bit, and the flag bit is used to indicate a quantity of times that the packet 210a can be subject to aggregation. In this embodiment, for example, the packet 210a can be subject to aggregation three times. In this case, the flag bit may be set to T=3.

The node 110l triggers, by using a timer 1 of the node 110l, the encapsulated packet 210a to be forwarded upward. As shown in the figure, the packet 210a is forwarded to the node 110k. The timer 1 of the node 110l is set by the node 110l, and is an independent timer of the node 110l.

For example, the node 110l may randomly set a start moment as a start moment 1 of the timer 1, and randomly set duration 1 as a timing segment of the timer 1. When the duration 1 of the timer 1 expires, the encapsulated packet 210a is triggered to be forwarded upward, or when the duration 1 meets a specific preset value, the encapsulated packet 210a is triggered to be forwarded upward.

After the node 110k receives the packet 210a, the node 110k saves the packet 210a in a buffer of the node 110k.

When a timer 2 of the node 110k triggers an encapsulated packet to be forwarded upward, the node 110k queries for the packet 210a in the buffer, and aggregates the packet 210a and a packet of the node 110k to obtain a packet 210b and then sends the packet 210b to the node 110h. The timer 2 of the node 110k is set by the node 110k, and is an independent timer of the node 110k.

For example, the node 110k may randomly set a start moment as a start moment 2 of the timer 2, and randomly set duration 2 as a timing segment of the timer 2. When the duration 2 of the timer 2 expires, the encapsulated packet 210b is triggered to be forwarded upward, or when the duration 2 meets a specific preset value, the encapsulated packet 210b is triggered to be forwarded upward.

Optionally, when the packet 210a includes the flag bit T=3, a flag bit in the packet 210b is T=2, which indicates that the packet has been subject to aggregation once.

After the node 110h receives the packet 210b, the node 110h saves the packet 210b in a buffer of the node 110h.

When a timer 3 of the node 110h triggers an encapsulated packet to be forwarded upward, the node 110h queries for the packet 210b in the buffer, and aggregates the packet 210b and a packet of the node 110h to obtain a packet 210c and then sends the packet 210c to the node 110e. The timer 3 of the node 110h is set by the node 110h, and is an independent timer of the node 110h.

For example, the node 110h may randomly set a start moment as a start moment 3 of the timer 3, and randomly set duration 3 as a timing segment of the timer 3. When the duration 3 of the timer 3 expires, the encapsulated packet 210c is triggered to be forwarded upward, or when the duration 3 meets a specific preset value, the encapsulated packet 210c is triggered to be forwarded upward.

Optionally, when the packet 210a includes the flag bit T=3, a flag bit in the packet 210c is T=1, which indicates that the packet has been subject to aggregation twice.

After the node 110e receives the packet 210c, the node 110e saves the packet 210c in a buffer of the node 110e.

When a timer 4 of the node 110e triggers an encapsulated packet to be forwarded upward, the node 110e queries for the packet 210c in the buffer, and aggregates the packet 210c and a packet of the node 110e to obtain a packet 210d and then sends the packet 210d to the node 110b. The timer 4 of the node 110e is set by the node 110e, and is an independent timer of the node 110e.

For example, the node 110e may randomly set a start moment as a start moment 4 of the timer 4, and randomly set duration 4 as a timing segment of the timer 4. When the duration 4 of the timer 4 expires, the encapsulated packet 210d is triggered to be forwarded upward, or when the duration 4 meets a specific preset value, the encapsulated packet 210d is triggered to be forwarded upward.

Optionally, when the packet 210a includes the flag bit T=3, a flag bit in the packet 210d is T=0, which indicates that the packet has been subject to aggregation three times.

It should be understood that, the flag bit T=3 included in the packet 210a indicates that the packet 210a can be subject to aggregation three times. When the packet 210d is obtained, the packet 210a has been subject to aggregation three times. Therefore, when T=3, after the node 110b receives the packet 210d, the node 110b does not save the packet 210d in a buffer of the node 110b, but directly forwards the packet 210d to the root node 110a. In other words, the packet 210d and the packet 210e in FIG. 2 are consistent.

The packet aggregation is simply adding payload parts of two different packets that have a same destination address but different source addresses, and does not relate to complex payload processing, where a header is a header generated by a node that performs the aggregation behavior.

For example, the packet 210a generated by the node 110l is {header l, payload l}, and a packet generated by the node 110k is {header k, payload k}. The packet 210b generated by the node 110k by aggregating the packet 210a and the packet of the node 110k is {header k, payload l and payload k}. A form of a packet obtained by another intermediate node through aggregation is similar thereto. Details are not described.

In the packet sending method including the packet aggregation based on a hop count, because a timer of each node is set by the node, aggregation is random and efficiency is low.

For example, before the packet 210a generated by the node 110l is sent to the node 110k, the timer 2 of the node 110k has triggered a packet of the node 110k to be sent. In this case, the node 110k does not perform aggregation for the packet 210a before sending, but directly sends the packet of the node 110k to the node 110h.

It should be understood that, in the packet aggregation manner based on a hop count, to ensure packet time validity, packet aggregation cannot be performed excessive times. In other words, a value of T cannot be set to be excessively large. A larger quantity of aggregation times causes an intermediate node to wait a longer time. Therefore, an excessive quantity of packet aggregation times affects packet time validity.

It should be further understood that, in the packet aggregation manner based on a hop count, to ensure normal forwarding of a packet, an intermediate node that forwards the packet needs to be in an active state for a long time. Consequently, power of the intermediate node is greatly consumed.

To resolve the foregoing problem, this application proposes a new packet sending method. The packet sending method in the embodiments of this application is described below in detail with reference to FIG. 3.

Figure 3:
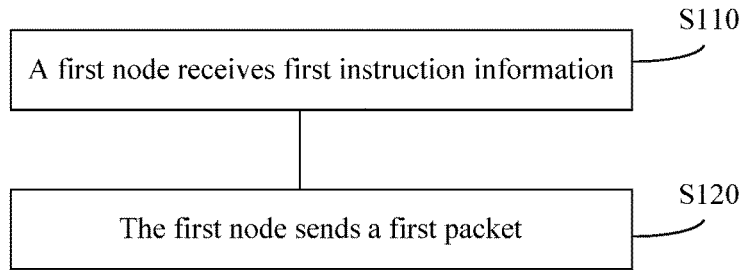
FIG. 3 is a schematic diagram of a packet sending method according to an embodiment of this application.

FIG. 3 is a schematic diagram of a packet sending method according to an embodiment of this application. The schematic diagram includes two steps: S110 and S120. The two steps are described below in detail.

S110. A first node receives first instruction information.

The first node receives the first instruction information. The first instruction information is used to instruct the first node to send a packet after a first moment.

In this embodiment of this application, the first node receives the first instruction information, where the first instruction information instructs the first node to send a packet after the first moment, to provide a wait time for the first node to perform aggregation for a packet upward sent by a child node of the first node.

Optionally, in some embodiments, the first instruction information is specifically used to instruct the first node to send a packet after the first moment in a first sending period.

In this embodiment, the first node may periodically send a packet, and needs to wait, before a first moment in each period, for a child node to upward send a packet, so that packet aggregation performance can be improved.

Optionally, in some embodiments, the first instruction information is carried in synchronization clock signaling, and the synchronization clock signaling further includes indication information of a start moment of the first period.

The case in which the first instruction information is carried in the synchronization clock signaling is described below in detail.

First, that the first node obtains the synchronization clock signaling includes as follows:

Optionally, in some embodiments, the synchronization clock signaling obtained by the first node may be delivered from a root node, which includes the following two cases:

In a case 1, the root node delivers a broadcast application message. The application message carries the synchronization clock signaling. The application message may be a periodic message, or may be another configuration message. A purpose of the application message may be unrelated to the synchronization clock signaling.

Optionally, in some embodiments, the first node receives the application message, obtains the synchronization clock signaling from the application message, and obtains the first instruction information based on the synchronization clock signaling, to determine the first moment.

Optionally, in some embodiments, the first node receives second indication information, and the second indication information is used to indicate that the synchronization clock signaling carries the first instruction information.

Optionally, in some embodiments, the second indication information and the synchronization clock signaling are carried in a same message.

For example, the second indication information and the synchronization clock signaling are carried in the application message, and the second indication information is used to indicate that the synchronization clock signaling carried in the application message carries the first instruction information.

For example, the second indication information included in the application message includes a flag Flag field, which may be set as follows: When Flag=1, the synchronization clock signaling carried in the application message carries the first instruction information; and when Flag=0, the synchronization clock signaling carried in the application message does not carry the first instruction information, or it may be directly understood as that the application message does not carry the synchronization clock signaling.

Alternatively, when the application message does not include Flag, the synchronization clock signaling carried in the application message does not carry the first instruction information, or it may be directly understood as that the application message does not carry the synchronization clock signaling.

It should be understood that the second indication information is flag Flag only for example, and may alternatively be in another form.

For example, the second indication information includes whether the application message carries a null NULL instruction. When the application message carries a NULL instruction, the synchronization clock signaling carried in the application message does not carry the first instruction information, or it may be directly understood as that the application message does not carry the synchronization clock signaling.

When the application message does not carry a NULL instruction, it indicates that the synchronization clock signaling carried in the application message carries the first instruction information.

It should be understood that, Flag occupies 1 bit, and whether the application message carries the synchronization clock signaling is determined based on a Flag value only for example.

For example, Flag may occupy two bits, a corresponding value Flag=11 indicates that the application message carries the synchronization clock signaling and the synchronization clock signaling carries the first instruction information, and when Flag=00 is set, the application message does not carry the synchronization clock signaling.

It should be understood that, for indicating that the application message carries the synchronization clock signaling and the synchronization clock signaling carries the first instruction information, the second indication information may be other indication information in addition to those in the foregoing examples. The other indication information is not enumerated herein.

Optionally, in some embodiments, the first instruction information is further used to indicate a first quantity, and the first quantity is a quantity of times that the first instruction information is forwarded before reaching the first node.

It should be understood that, when the first instruction information is carried in the synchronization clock signaling, and the synchronization clock signaling is carried in the application message, the first quantity may further indicate a quantity of times that the application message received by the first node is forwarded before reaching the first node.

A brief description is provided below based on the network system scenario shown in FIG. 1.

For example, the first quantity included in the application message includes a hop HOP field, and when delivering the application message, the root node 110a sets HOP=0, to indicate that the application message has not been forwarded. When the root node 110a delivers the application message to the node 110b connected to the root node 110a, the node 110b may determine, based on the HOP value, that the application message has not been forwarded.

Then, the node 110b sends the application message to the node 110d and the node 110e on a downlink, and sets HOP=1. The node 110d determines, based on the HOP value, that the application message has been forwarded once. By analogy, every time the application message is sent, the HOP value is increased by 1.

It should be understood that, the first quantity is HOP only for example, and may alternatively be in another form.

For example, the first quantity is a number of a layer to which each node belongs in the network system.

A brief description is provided below based on the network system scenario shown in FIG. 1.

For example, the first quantity included in the application message includes a layer identifier (L ID) of a layer to which a node belongs. If the root node 110a belongs to a layer 0 in the network system, an L ID is 0, which indicates that the application message has not been forwarded. When the root node 110a delivers the application message to the node 110b connected to the root node 110a, the node 110b may determine, based on the L ID value, that the application message has not been forwarded.

Then, the node 110b sends the application message to the node 110d and the node 110e on a downlink, and sets L ID=1. The node 110d determines, based on the HOP value, that the application message has been forwarded once. By analogy, every time the application message is sent, the L ID value is increased by 1.

It should be understood that, the HOP/L ID value that indicates the quantity of times that the application message is forwarded is increased from 0 only for example. For example, the HOP/L ID value is decreased from 100. When receiving the application message, each node determines, based on a difference between an HOP/L ID value and 100, a quantity of times that the application message is forwarded.

It should be understood that, for indicating the quantity of times that the application message is forwarded, the first quantity may be other indication information in addition to those in the foregoing examples. The other indication information is not enumerated herein.

Optionally, in some embodiments, the first instruction information includes information about the first moment, and the first node determines the first moment based on the information about the first moment.

For example, if the information about the first moment that is included in the first instruction information is the fifth ms in the sending period, the first node determines that the first moment is the fifth ms in the sending period.

Optionally, in some other embodiments, the first instruction information is further used to indicate a first quantity, and the first quantity is a quantity of times that the first instruction information is forwarded before reaching the first node.

The first node obtains the first moment through calculation based on the first quantity and preset first duration.

For example, if the first instruction information includes the first quantity HOP=5, and the preset first duration is 1 ms, the first node determines that the first moment is the fifth ms in the sending period. It should be understood that, the first duration may be included in the first instruction information, or may be directly determined based on a system configuration.

In a case 2, the root node directly delivers the synchronization clock signaling to each node in a network.

For example, the root node directly sends related information of the synchronization clock signaling to each node in the network. The related information of the synchronization clock signaling (for example, a quantity of times that the synchronization clock signaling is forwarded) does not need to be carried in another message. Each node determines the synchronization clock signaling based on the received related information of the synchronization clock signaling.

It should be understood that, in the related information that is of the synchronization clock signaling and that is directly sent by the root node to each node in the network, indication information used to indicate the quantity of times that the synchronization clock signaling is forwarded is similar to the first quantity.

Optionally, in some other embodiments, the synchronization clock signaling obtained by the first node may be the synchronization clock signaling configured by the network system.

For example, the synchronization clock signaling has been configured in the network system, and the first node may directly perform packet aggregation based on the configured synchronization clock signaling.

Optionally, in some embodiments, the first node sends the first instruction information to the second node, where the first instruction information is used to instruct the second node to send a second packet after a second moment, and the second moment is earlier than the first moment within a same period.

For example, the first node may send the application message to the second node. The second node obtains the synchronization clock signaling in the application message based on the first instruction information in the application message. Further, the second node obtains the first instruction information.

S120. The first node sends a first packet.

Optionally, in some embodiments, the first node sends the first packet after the first moment according to the first instruction information.

For example, the first moment is the fifth ms in the period, and the first node sends the first packet after the fifth ms arrives.

Optionally, in some other embodiments, the first node sends, according to the first instruction information, the first packet before the first moment when a first parameter meets a preset condition, where the first parameter includes at least one of the following parameters: a child node of the first node from which the first packet comes and a size of current remaining buffer space of the first node.

For example, each child node of the first node has reported a packet.

For another example, the first node does not have a child node connected to the first node.

For another example, buffer space of the first child node meets a preset condition.

Optionally, in some other embodiments, the first node receives, before the first moment, a second packet sent by a second node, where the second node is a child node of the first node; and the first node generates the first packet based on the second packet.

Optionally, in some other embodiments, the first node generates a third packet based on to-be-sent data.

Optionally, in some other embodiments, the first node aggregates the second packet and the third packet to generate the first packet.

How the first node aggregates the second packet and the third packet to generate the first packet is described below in detail with reference to the description in S110.

As described in S110, the first instruction information is carried in the synchronization clock signaling, and the synchronization clock signaling further includes the indication information of the start moment of the first period.

For example, the synchronization clock signaling is carried in an application message. The first node uses a moment at which the first node receives the application message as a first start moment, and the first node obtains the start moment based on a link delay and the first start moment. The link delay is a preset time required by the application message to reach the first node after being forwarded.

Optionally, in some embodiments, the link delay may be obtained through calculation based on a quantity of times that the application message is forwarded before reaching the first node, and the quantity of times that the application message is forwarded is indicated by the first quantity.

For example, the link delay is obtained by the first node through calculation based on the first quantity and the preset first duration. The first duration is determined based on a transmission delay between a parent node and a child node, or the first duration may be determined based on an empirical value.

Specifically, if the first node uses the moment at which the first node receives the application message as the first start moment T0, the first duration that is duration consumed to forward the application message once is preset by the system to 1 ms, and the application message received by the first node is forwarded three times, the start moment is T=T0−1 ms*3.

Optionally, in some embodiments, the link delay may be further used to indicate a time interval between the first moment and the start moment. A longer link delay indicates a shorter time interval, and a shorter link delay indicates a longer time interval. It may be understood as that the time interval and the link delay are in a negative correlation function.

Optionally, in some embodiments, the first packet generated by the first node carries a second identifier that indicates a type of the first packet. For example, the second identifier includes a traffic identifier (TID), and based on the TID, the first packet is saved in a buffer buffer corresponding to the TID.

It should be understood that, the second identifier may alternatively be directly expressed as information such as temperature, humidity, or traffic. A specific form of how to indicate the packet type is not limited in this application.

Figure 4:
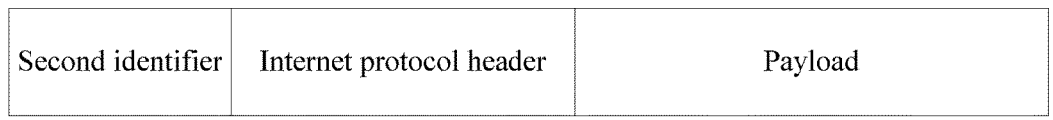
FIG. 4 is a specific form of a packet according to an embodiment of this application.

A specific form of the first packet is shown in FIG. 4.

A second identifier is used to indicate the type of the first packet.

An Internet protocol header (IP header) field is used to indicate a protocol type of the first packet.

A payload (payload) is used to indicate an amount of data specifically included in the first packet.

Optionally, in some other embodiments, the second packet upward sent by the second node also includes the second identifier (for example, a TID). The first node may determine, based on the TID in the second packet and based on a preset condition, whether the second packet can be subject to aggregation. If the second packet can be subject to aggregation, the second packet is saved in a buffer corresponding to the carried TID, and a counter for the buffer in the first node is increased by 1. The counter is used to indicate a quantity of packets in the buffer that wait for aggregation, or indicate a quantity of second packets received by the first node.

For example, a type of the second packet upward sent by the second node in the first duration is temperature. The first node determines, based on a status of the first node (for example, whether the first node includes a buffer configured to buffer temperature information) or based on a system preset condition (for example, the system specifies that temperature information cannot be subject to aggregation and needs to be reported in time), whether the temperature information can be subject to aggregation. When the second packet can be subject to aggregation, the first node saves the second packet in the corresponding buffer.

It should be understood that, the first node may include a plurality of second nodes on a downlink, and therefore may receive a plurality of second packets. The first packet and the second packet are aggregated in the first duration to obtain the third packet.

It should be understood that, a time for obtaining the third packet through packet aggregation may be as follows: In the time interval, when a new packet is saved in a corresponding buffer, the new saved packet and an existing packet in the buffer are aggregated. Alternatively, in the time interval, aggregation is performed once every a period of time. A specific time for aggregation is not limited.

Figure 5:
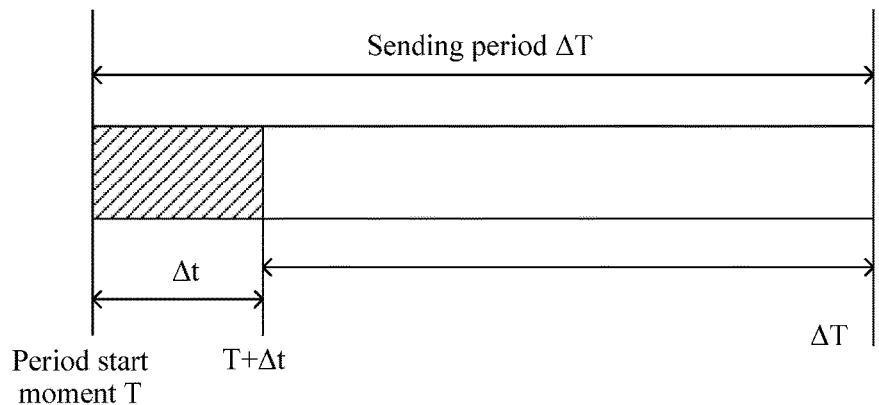
FIG. 5 is a schematic diagram of a packet aggregation time window according to an embodiment of this application.

A specific form of a time window used for the first node to perform packet aggregation is shown in FIG. 5.

A sending period ΔT includes a packet aggregation time Δt for the first node. A start moment of the sending period is T, and may be the foregoing start moment obtained through calculation. The first moment is T+Δt.

A time at which the first node generates the first packet may be any moment in duration of T to T+Δt.

A time at which the second node reports the packet may also be any moment in the duration of T to T+Δt.

It should be understood that, in duration of T+Δt to ΔT shown in FIG. 5, the first node does not perform packet aggregation anymore.

When the preset condition is met, the first node sends the packet.

The first node sends the first packet to a third node. The third node is a parent node of the first node.

The preset condition includes the following several cases.

In a case 1, the first node does not have a child node connected to the first node.

For example, if the first node receives, in K consecutive periods, no message upward sent by a child node, it may be considered that the child node of the first node is offline. Alternatively, if duration in which the first node receives no message upward sent by a child node is greater than preset duration, it may be determined that the child node of the first node is offline.

In the scenario of the case 1, after generating the first packet, the first node does not need to perform packet aggregation, but directly sends the first packet to the parent node of the first node.

In a case 2, each child node of the first node has upward sent the second packet.

For example, the first node may determine a quantity of child nodes of the first node based on experience. After each child node of the first node has reported a packet, without waiting the first duration to expire, the first node may aggregate the packet generated by the first node and packets upward sent by all downlink nodes, and send an aggregated packet to the parent node of the first node.

In a case 3, the buffer of the first node meets a first preset capacity.

For example, when a capacity of the buffer of the first node reaches the first preset capacity and cannot continuously save a new packet, the first node aggregates packets in the buffer, and sends an aggregated packet to the parent node of the first node.

In a case 4, second duration in which the first node aggregates the first packet and the second packet to obtain the third packet is greater than or equal to the first duration.

The packet sending method in this application is described below with reference to a specific embodiment.

For example, the application message delivered by the root node carries the synchronization clock signaling, the synchronization clock signaling carries the first instruction information, and an application scenario is the tree topology network system shown in FIG. 1.

For example, the root node 110a delivers a broadcast message based on the generic autonomic signaling protocol (GRASP).

Figure 6:
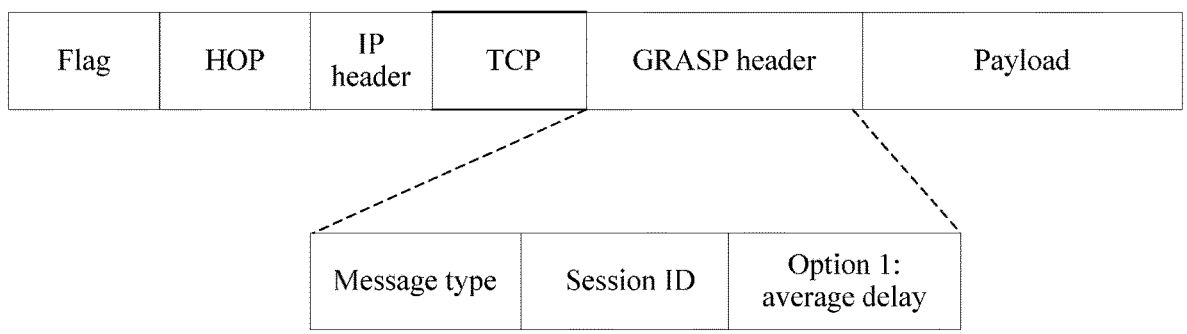
FIG. 6 is a specific signaling format according to an embodiment of this application.

FIG. 6 is a specific signaling format according to an embodiment of this application.

The second indication information Flag field is used to indicate that the broadcast message carries the related information.

Similar to Flag in FIG. 3, and a value of Flag may be set to 1, in other words, Flag=1, to indicate that the broadcast message carries the related information.

A first quantity HOP field is used to indicate a quantity of times that the broadcast message is forwarded. When the root node 110a delivers the broadcast message, a value of HOP may be set to 0, in other words, HOP=0, to indicate that the broadcast message has not been forwarded when being delivered by the root node.

An Internet protocol header (IP header) is a conventional IP header, and includes a basic field of the IP protocol header.

A generic autonomic signaling protocol header (GRASP header) is a header used in a generic signaling protocol.

It should be understood that, Chinese interpretations and English full names of the IP header and the GRASP header are all names defined for ease of distinguishing, and should not be construed as any limitation on this application. This application does not preclude possibility of using other names in place of the foregoing names in existing or future protocols.

The transmission control protocol (TCP) is a connection-oriented, reliable, byte-stream-based transport layer communications protocol.

In this embodiment, the related information is carried in front of the IP header (is carried in the Flag field and the HOP field shown in FIG. 6) and in an option option (an option 1: average delay (Opt1: Average delay, Ave_delay) shown in FIG. 6) of the GRASP header.

A message type (Msg_type) is used to define a new message type. Because the GRASP is a generic signaling protocol, when the related information is carried, a new message type needs to be defined. Msg_type is not limited in this embodiment, and may be defined as any message type.

A session identifier (Session ID) is used to indicate an identifier of a current session, and is unrelated to this embodiment. This is not described herein in detail.

Ave_delay is an average delay of single hops on a link. The single hop means that the broadcast message is forwarded once.

A value of Ave_delay is determined based on an empirical value. The system may determine the value of Ave_delay based on a time for forwarding another message once, or based on an average value of times for forwarding the broadcast message once in T previous periods.

After receiving the broadcast message, downlink child nodes (the node 110b to the node 110k shown in FIG. 1) of the root node 110a parse the broadcast message. A parsing process includes as follows.

Step 1: The child node parses out an IP layer of the broadcast message and determines that Flag=1, and after increasing a HOP value by 1, forwards the broadcast message to a downlink child node of the child node.

For example, the node 110b parses out the IP layer of the broadcast message and determines that Flag=1 and HOP=0, and after increasing the HOP value by 1, the node 110b forwards the broadcast message to downlink child nodes (the node 110d and the node 110e shown in FIG. 1) of the node 110b.

The node 110c parses out the IP layer of the broadcast message and determines that Flag=1 and HOP=0, and after increasing the HOP value by 1, the node 110c forwards the broadcast message to a downlink child node (the node 110f shown in FIG. 1) of the node 110c.

The node 110e parses out the IP layer of the broadcast message and determines that Flag=1 and HOP=1, and after increasing the HOP value by 1, the node 110e forwards the broadcast message to downlink child nodes (the node 110g and the node 110h shown in FIG. 1) of the node 110e.

By analogy, the broadcast message is finally sent to nodes (the node 110i, the node 110j, and the node 110k shown in FIG. 1) at a lowest layer in the network system.

Step 2: The child node continues to parse out another field behind the IP layer of the broadcast message, to obtain Ave_delay.

For example, the node 110b obtains Ave_delay by parsing out the another field behind the IP layer. Similarly, after receiving the broadcast message, the node 110c to the node 110k all can obtain a value of Ave_delay by parsing out the another field behind the IP layer.

It should be understood that, Flag, HOP, and Ave_delay are the related information. It may be understood that, HOP and Ave_delay are the first instruction information because the child node can determine the first moment and the start moment of the sending period based on HOP and Ave_delay, and Flag is the second indication information, based on which it is determined that the related information is carried.

How the child node calculates a packet generation time and a packet aggregation wait time of the child node based on the carried related information after parsing the broadcast message is described below. Details are as follows.

Step 1: The child node uses a moment at which the child node receives the broadcast message as a first start moment T0, and based on the values of signaling Flag and HOP that are obtained by the child node by parsing the broadcast message in step 1, determines that the broadcast message carries the related information and determines a quantity of times that the broadcast message is forwarded.

For example, after receiving the broadcast message, the node 110b determines, based on Flag=1, that the broadcast message carries the related information, and determines, based on HOP=0, that the broadcast message has not been forwarded. The node 110b uses a moment T1 at which the node 110b receives the broadcast message as a first start moment T1.

After receiving the broadcast message, the node 110d determines, based on Flag=1, that the broadcast message carries the related information, and determines, based on HOP=1, that the broadcast message has been forwarded once. The node 110d uses a moment T2 at which the node 110d receives the broadcast message as a first start moment T2.

By analogy, each node in the network system can obtain a first start moment corresponding to the node and a quantity of times that the broadcast message is forwarded when the broadcast message is received.

Step 2: The child node calculates a start moment T of the packet generation time and the packet aggregation wait time of the child node.

T=T0−Ave_delay*HOP. The HOP value and the Ave_delay value have been obtained when the broadcast message is parsed. T0 is determined based on the first start moment in step 1.

For example, the node 110b calculates a start moment T of a packet generation time and a packet aggregation wait time of the node 110b, where T=T1−Ave_delay*0=T1.

The node 110d calculates a start moment T of a packet generation time and a packet aggregation wait time of the node 110d, where T=T2−Ave_delay*1=T2−Ave_delay.

It can be learned from a relationship between the node 110b and the node 110d in the network system shown in FIG. 1 that, the node 110d is a downlink node directly connected to the node 110b. It should be understood that, a link delay for forwarding the broadcast message from the node 110b to the node 110d is Ave_delay. Therefore, it may be approximately considered that T2=T1+Ave_delay.

Accordingly, it can be obtained through calculation that, the start moment T calculated by the node 110b is equal to the start moment T calculated by the node 110d.

By analogy, each node in the network system can obtain the same start moment T through calculation.

Step 3: The child node calculates first duration of the packet generation time and the packet aggregation wait time of the child node.

Δt=Ave_delay*(Deep−HOP)*alpha, where alpha is a coefficient and may be adjusted based on different application scenarios, a depth Deep is a preset value (which may be understood as a quantity of layers of the tree topology network shown in FIG. 1).

For example, the node 110b calculates first duration Δt of the packet generation time and the packet aggregation wait time of the node 110b, where Δt=Ave_delay*(Deep−0)*alpha=Ave_delay*Deep*alpha. The quantity of layers of the tree topology network shown in FIG. 1 is 5. Assuming that Deep=5, for the node 110b, Δt=5*Ave_delay*alpha.

The node 110d calculates first duration Δt of the packet generation time and the packet aggregation wait time of the node 110d, where Δt=Ave_delay*(Deep−1)*alpha. The quantity of layers of the tree topology network shown in FIG. 1 is 5. Assuming that Deep=5, for the node 110b, Δt=4*Ave_delay*alpha.

It can be learned from the relationship between the node 110b and the node 110d in the network system shown in FIG. 1 that, the node 110d is a downlink node directly connected to the node 110b. It should be understood that first duration that is of a packet generation time and a packet aggregation wait time of a node closer to the root node and that is calculated by the node is longer. It may be understood as that a length of first duration of each node is negatively correlated with the link delay.

By analogy, each node in the network system can obtain first duration of a packet generation time and a packet aggregation wait time of the node through calculation.

After the child node calculates the packet generation time and the packet aggregation wait time of the child node, the child node performs packet aggregation based on the times. Details are as follows.

Step 1: The node receives a packet upward sent by a downlink node, to complete packet aggregation.

For example, the node 110b receives packets upward sent by the node 110d and the node 110e. It can be learned from the packet generation time and the packet aggregation wait time of the child node that are calculated by the node that, start moments of packet generation times all nodes in the network system are consistent, but a node closer to the root node 110a has longer first duration.

To be specific, for the node 110b, a start moment for generating the first packet is T, and first duration is Δt=5*Ave_delay*alpha; for the node 110d and the node 110e, a start moment for generating the second packet is T, and first duration is Δt=4*Ave_delay*alpha. This can ensure that the node 110b can complete aggregation of the first packet and the second packet in one period.

Step 2: The node sends an aggregated packet.

Similar to the description in S120 in FIG. 3, when a preset condition is met, the node sends the aggregated packet.

In a case 1, the node does not have a downlink child node connected to the node.

For example, as a node at the lowest layer in the network system, the node 110i, the node 110j, or the node 110k in FIG. 1 does not include a downlink node. Therefore, after generating a packet, the node 110i, the node 110j, or the node 110k sends the packet to an uplink node. The node 110i and the node 110j each send a generated packet to the node 110g. The node 110k sends a generated packet to the node 110h.

In a case 2, each downlink child node connected to the node has upward sent a packet.

For example, child nodes (the node 110i and the node 110j) of the node 110g in FIG. 1 each have sent a generated packet to the node 110g. Therefore, the node 110g aggregates packets upward sent by the node 110i and the node 110j and a packet generated by the node 110g, and sends an aggregated packet to a parent node (the node 110e) of the node 110g.

In a case 3, buffer space of the node meets a preset condition.

For example, buffer space of the node 110g in FIG. 1 is A. When remaining buffer space is 0.1A, the node 110g aggregates a received packet and a packet generated by the node 110g, and sends an aggregated packet to a parent node (the node 110e).

For another example, every time a packet upward sent by a child node is received, a counter of the node is increased by 1. When an accumulated value of the counter reaches the preset value A, an aggregated packet is sent to a parent node.

In a case 3, a packet aggregation time of the node reaches a preset time.

For example, an aggregation time of the node 110g in FIG. 1 in a sending period has expired. As shown in FIG. 5, in duration of T+Δt to ΔT in a sending period, when receiving a packet or generating a packet, the node 110g directly forwards the packet to the parent node without waiting.

The root node 110a delivers a broadcast message based on the generic autonomic signaling protocol (GRASP). The broadcast message carries the related information of the synchronization clock signaling.

Figure 7:
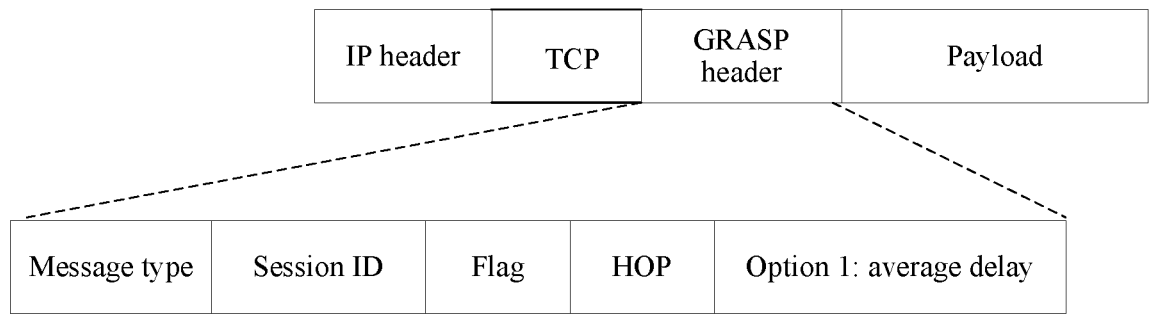
FIG. 7 is another specific signaling format according to an embodiment of this application.

FIG. 7 is another specific signaling format according to an embodiment of this application.

A difference between the specific signaling format shown in FIG. 7 and that in FIG. 6 lies in that in the signaling format, all information related to the synchronization signaling is placed in an option option (an option 1 Opt1: average delay (Average delay, Ave_delay), Flag, or HOP shown in FIG. 7) of a GRASP header.

Different from FIG. 6, after receiving the broadcast message, downlink child nodes (the node 110b to the node 110k shown in FIG. 1) of the root node 110a parse the broadcast message. A parsing process includes as follows.

Step 1: The child node parses the broadcast message, parses out a GRASP header layer to obtain all the related information, determines that Flag=1, and after increasing a HOP value by 1, forwards the broadcast message to a downlink child node of the child node.

For example, the node 110b parses out the GRASP header layer of the broadcast message and determines that Flag=1 and HOP=0, and after increasing the HOP value by 1, the node 110b forwards the broadcast message to downlink child nodes (the node 110d and the node 110e shown in FIG. 1) of the node 110b.

The node 110c parses out the GRASP header layer of the broadcast message and determines that Flag=1 and HOP=0, and after increasing the HOP value by 1, the node 110c forwards the broadcast message to a downlink child node (the node 110f shown in FIG. 1) of the node 110c.

The node 110e parses out the GRASP header layer of the broadcast message and determines that Flag=1 and HOP=1, and after increasing the HOP value by 1, the node 110e forwards the broadcast message to downlink child nodes (the node 110g and the node 110h shown in FIG. 1) of the node 110e.

By analogy, the broadcast message is finally sent to nodes (the node 110i, the node 110j, and the node 110k shown in FIG. 1) at a lowest layer in the network system.

That the node calculates a start moment T of a packet generation time and a packet aggregation wait time of the node and first duration of the packet generation time and the packet aggregation wait time of the node based on Ave_delay obtained through parsing is similar to that in FIG. 6. Details are not described herein again.

That the node aggregates packets and sends a packet when a preset condition is met is consistent with that in FIG. 6. Details are not described herein again.

Different from the signaling format shown in FIG. 6, the signaling format shown in FIG. 7 does not require a modification to an existing IP header format.

The packet sending method provided in the embodiments of this application is described above with reference to FIG. 1 to FIG. 7. A packet sending apparatus provided in the embodiments of this application is described below with reference to FIG. 8 and FIG. 9.

Figure 8:
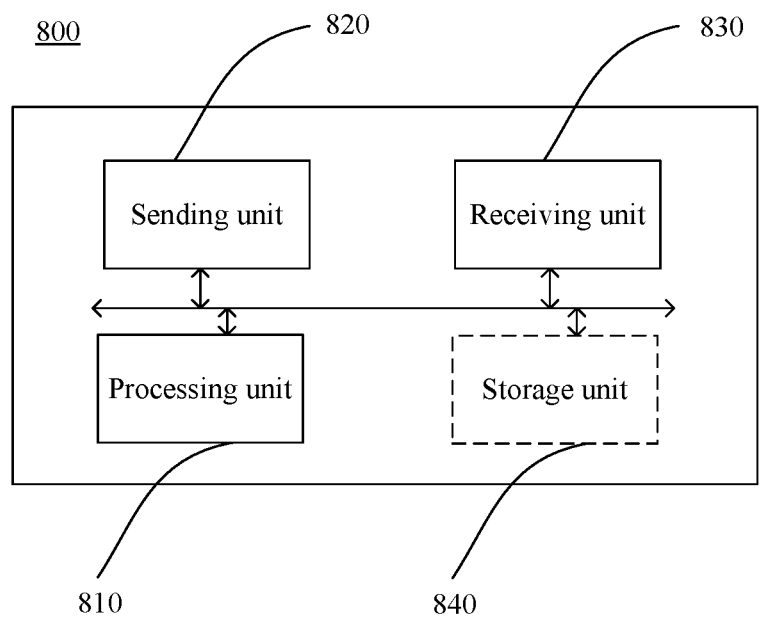
FIG. 8 is a schematic structural diagram of a packet sending apparatus 800 according to an embodiment of this application.

FIG. 8 is a schematic structural diagram of a packet sending apparatus 800. The apparatus 800 can be configured to implement the method described in the foregoing method embodiments, and reference may be made to the description in the foregoing method embodiments. The packet sending apparatus 800 may be a chip, or may be the first node, the second node, or the like in the foregoing method embodiments.

The packet sending apparatus 800 includes one or more processing units 810. The processing unit 810 may be a general-purpose processor, a dedicated processor, or the like. For example, the processing unit 810 may be a baseband processor or a central processing unit. The baseband processor may be configured to process a communications protocol and communication data. The central processing unit may be configured to control the packet sending apparatus (for example, a base station, a terminal, or a chip), execute a software program, and process data of the software program.

The packet sending apparatus may include a sending unit 820, configured to output (send) a signal. For example, the packet sending apparatus may be a chip, and the sending unit 820 may be an output circuit or a communications interface of the chip. The chip may be used on a terminal device. For another example, the packet sending apparatus may be a terminal device, and the sending unit 820 may be a transceiver, a radio frequency chip, or the like.

The packet sending apparatus may include a receiving unit 830, configured to input (receive) a signal. For example, the packet sending apparatus may be a chip, and the sending unit 820 may be an input circuit or a communications interface of the chip. The chip may be used on a terminal device. For another example, the packet sending apparatus may be a terminal device, and the receiving unit 830 may be a transceiver, a radio frequency chip, or the like.

The packet sending apparatus 800 includes the one or more processing units 810, and the one or more processing units 810 can implement the packet sending method performed by the first node in the embodiments shown in FIG. 1 to FIG. 7. Details are as follows:

The sending unit is configured to send a first packet.

The receiving unit is configured to receive first instruction information, where the first instruction information is used to instruct the first node to send a packet after a first moment.

The sending unit is further configured to send the first packet after the first moment according to the first instruction information.

The sending unit is further configured to send, according to the first instruction information, the first packet before the first moment when a first parameter meets a preset condition.

The first parameter includes at least one of the following parameters: a child node of the first node and a size of current remaining buffer space of the buffer unit.

The receiving unit is further configured to receive, before the first moment, a second packet sent by a second node, where the second node is a child node of the first node; and the processing unit is configured to generate the first packet based on the second packet.

The processing unit is further configured to: generate a third packet based on to-be-sent data, and aggregate the second packet and the third packet to generate the first packet.

The processing unit is further configured to generate the first packet based on to-be-sent data.

In a possible design, the first instruction information is carried in synchronization clock signaling, and the synchronization clock signaling further includes indication information of a start moment of the first period; and the receiving unit is further configured to receive second indication information, where the second indication information is used to indicate that the synchronization clock signaling carries the first instruction information.

In a possible design, the second indication information and the synchronization clock signaling are carried in a same message.

In a possible design, the first instruction information includes information about the first moment, and the processing unit determines the first moment based on the information about the first moment.

In a possible design, the first instruction information is further used to indicate a first quantity, and the first quantity is a quantity of times that the first instruction information is forwarded before reaching the first node; and the processing unit obtains the first moment through calculation based on the first quantity and preset first duration.

Figure 9:
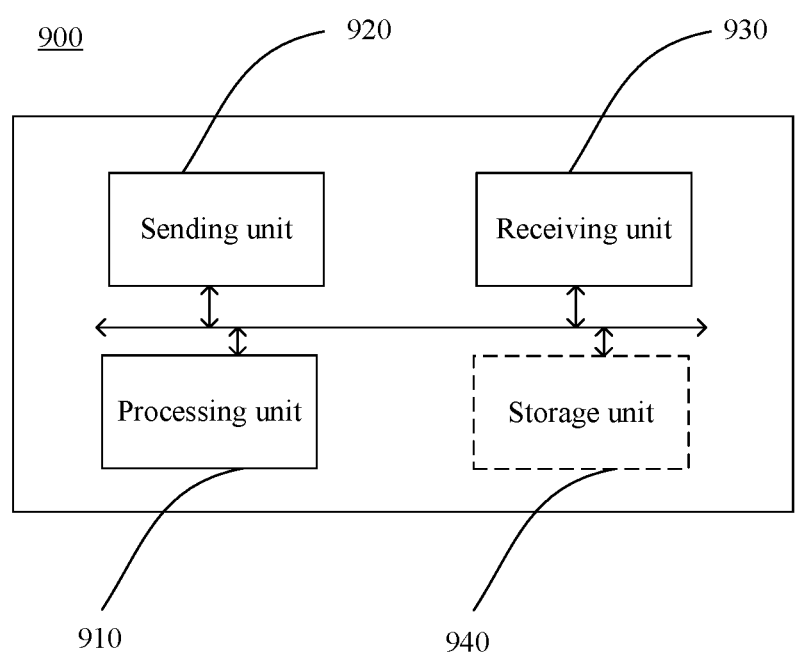
FIG. 9 is a schematic structural diagram of another packet sending apparatus 900 according to an embodiment of this application.

FIG. 9 is a schematic structural diagram of a packet sending apparatus 900. The apparatus 900 can be configured to implement the method described in the foregoing method embodiments, and reference may be made to the description in the foregoing method embodiments. The packet sending apparatus 900 may be a chip, or may be the root node or the third node in the foregoing method embodiments.

The packet sending apparatus 900 includes one or more processing units 910. The processing unit 910 may be a general-purpose processor, a dedicated processor, or the like. For example, the processing unit 910 may be a baseband processor or a central processing unit. The baseband processor may be configured to process a communications protocol and communication data. The central processing unit may be configured to control the packet sending apparatus (for example, a base station, a terminal, or a chip), execute a software program, and process data of the software program.

The packet sending apparatus may include a sending unit 920, configured to output (send) a signal. For example, the packet sending apparatus may be a chip, and the sending unit 920 may be an output circuit or a communications interface of the chip. The chip may be used on a terminal device. For another example, the packet sending apparatus may be a network device or a terminal device, and the sending unit 920 may be a transceiver, a radio frequency chip, or the like.

The packet sending apparatus may include a receiving unit 930, configured to input (receive) a signal. For example, the packet sending apparatus may be a chip, and the sending unit 920 may be an input circuit or a communications interface of the chip. The chip may be used on a terminal device. For another example, the packet sending apparatus may be a network device or a terminal device, and the receiving unit 930 may be a transceiver, a radio frequency chip, or the like.

The packet sending apparatus 900 includes the one or more processing units 910, and the one or more processing units 910 can implement the packet sending method performed by the third node or the root node in the embodiments shown in FIG. 1 to FIG. 7. Details are as follows.

The sending unit is configured to send first instruction information, where the first instruction information is used to instruct a first node to send a packet after a first moment, and the first node is a child node of the root node.

The receiving unit is configured to receive a first packet, where the first packet is a packet sent by the first node according to the first instruction information.

In a possible design, the first packet is a first packet sent by the first node after the first moment according to the first instruction information.

In a possible design, the first packet is a packet sent according to the first instruction information by the first node before the first moment when a first parameter meets a preset condition; and the first parameter includes at least one of the following parameters: a child node of the first node from which the first packet comes and a size of current remaining buffer space of the first node.

In a possible design, the first packet is a packet generated by the first node based on a second packet, the second packet is a second packet that is sent by a second node and that is received by the first node before the first moment, and the second node is a child node of the first node.

In a possible design, the first packet is a packet generated by the first node by aggregating the second packet and a third packet; and the third packet is a packet generated by the first node based on to-be-sent data before the first node sends the first packet according to the first instruction information.

In a possible design, the first instruction information is specifically used to instruct the first node to send a packet after the first moment in a first sending period.

In a possible design, the first instruction information is carried in synchronization clock signaling, and the synchronization clock signaling further includes indication information of a start moment of the first period; and the sending unit is further configured to send second indication information, where the second indication information is used to indicate that the synchronization clock signaling carries the first instruction information.

In a possible design, the second indication information and the synchronization clock signaling are carried in a same message.

In a possible design, the first instruction information includes information about the first moment, and the information about the first moment is used to determine the first moment.

In a possible design, the first instruction information is further used to indicate a first quantity, and the first quantity is a quantity of times that the first instruction information is forwarded before reaching the first node; and the first quantity and preset first duration are used to calculate the first moment.

A person of ordinary skill in the art may be aware that, with reference to the examples described in the embodiments disclosed in this specification, units and algorithm steps can be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a first node, first instruction information, wherein the first instruction information instructs the first node to send a packet after a first moment, and wherein a communications system comprises the first node and a second node, the first node is a parent node and the second node is a child node of the first node, and a packet sent by the child node is forwarded by the parent node;
    receiving, by the first node before the first moment, a second packet sent by the second node;
    generating, by the first node, a first packet based on the second packet; and
    sending, by the first node, the first packet according to the first instruction information.

2. The method according to claim 1, wherein sending, by the first node, the first packet according to the first instruction information comprises:
    sending, by the first node, the first packet after the first moment according to the first instruction information.

3. The method according to claim 1, wherein sending, by the first node, the first packet according to the first instruction information comprises:
    sending, by the first node according to the first instruction information, the first packet before the first moment when a first parameter meets a preset condition, wherein the first parameter comprises: a child node of the first node from which the first packet is sent or a size of a current remaining buffer space of the first node.

4. The method according to claim 1, wherein before sending, by the first node, the first packet according to the first instruction information, the method further comprises:
    generating, by the first node, a third packet based on to-be-sent data; and
    wherein generating, by the first node, the first packet based on the second packet comprises:
        aggregating, by the first node, the second packet and the third packet to generate the first packet.

5. The method according to claim 1, wherein generating the first packet based on the second packet comprises:
    generating, by the first node, the first packet based on to-be-sent data and the second packet.

6. The method according to claim 1, wherein the first instruction information instructs the first node to send a packet after the first moment in a first sending period.

7. The method according to claim 6, wherein the first instruction information is carried in synchronization clock signaling, and the synchronization clock signaling further comprises indication information of a start moment of the first sending period.

8. The method according to claim 7, further comprising:
    receiving, by the first node, second indication information, wherein the second indication information indicates that the synchronization clock signaling carries the first instruction information.

9. The method according to claim 8, wherein the second indication information and the synchronization clock signaling are carried in a same message.

10. The method according to claim 1, wherein:
    the first instruction information comprises information about the first moment; and
    the method further comprises:
        determining, by the first node, the first moment based on the information about the first moment.

11. The method according to claim 1, wherein:
    the first instruction information further indicates a first quantity, and the first quantity is a quantity of times that the first instruction information is forwarded before reaching the first node; and
    the method further comprises:
        obtaining, by the first node, the first moment through calculation based on the first quantity and a preset first duration.

12. The method according to claim 11, wherein the preset first duration is determined based on a transmission delay between a corresponding parent node and child node.

13. An apparatus, comprising:
    a processor; and
    a non-transitory computer-readable storage medium storing a program to be executed by the processor, the program including instructions for:
        sending first instruction information, wherein the first instruction information instructs a first node to send a packet after a first moment, and wherein a communication system comprises the apparatus and a first node, the apparatus is configured to implement a root node, the first node is a child node of the root node, and a packet sent by the child node is forwarded by a parent node; and
        receiving a first packet, wherein the first packet is sent by the first node according to the first instruction information, the first packet comprises a second packet, and the second packet is received by the first node from a child node of the first node before the first moment.

14. The apparatus according to claim 13, wherein the first packet is sent by the first node after the first moment according to the first instruction information.

15. The apparatus according to claim 13, wherein:
the first packet is sent according to the first instruction information by the first node before the first moment when a first parameter meets a preset condition; and
the first parameter comprises: a child node of the first node from which the first packet is sent or a size of a current remaining buffer space of the first node.

16. The apparatus according to claim 13, wherein the first instruction information is carried in synchronization clock signaling, and the synchronization clock signaling further comprises indication information of a start moment of a first sending period.

17. The apparatus according to claim 16, wherein the program further includes instructions for:
sending second indication information, wherein the second indication information indicates that the synchronization clock signaling carries the first instruction information.

18. The apparatus according to claim 17, wherein the second indication information and the synchronization clock signaling are carried in a same message.

19. An apparatus, comprising:
a processor; and
a non-transitory computer-readable storage medium storing a program to be executed by the processor, the program including instructions for:
receiving first instruction information, wherein the first instruction information instructs a first node to send a packet after a first moment, and wherein a communications system comprises the apparatus and a second node, the apparatus is configured to implement the first node, the first node is a parent node and the second node is a child node of the first node, and a packet sent by the child node is forwarded by the parent node;
receiving, before the first moment, a second packet sent by the second node;
generating a first packet based on the second packet; and
sending the first packet according to the first instruction information.

* * * * *